United States Patent
Willis

(10) Patent No.: US 10,016,091 B1
(45) Date of Patent: Jul. 10, 2018

(54) TOASTER GRILL

(71) Applicant: Ronald L. Willis, Norman, OK (US)

(72) Inventor: Ronald L. Willis, Norman, OK (US)

( * ) Notice: Subject to any disclaimer, the term of this patent is extended or adjusted under 35 U.S.C. 154(b) by 0 days.

(21) Appl. No.: 14/822,339

(22) Filed: Aug. 10, 2015

(51) Int. Cl.
*A47J 43/18* (2006.01)
*A47J 37/08* (2006.01)
*A47J 37/06* (2006.01)

(52) U.S. Cl.
CPC ............... *A47J 37/08* (2013.01); *A47J 37/06* (2013.01)

(58) Field of Classification Search
CPC .................................. A47J 37/08; A47J 37/06
USPC .................. 99/441, 422, 426, 428, 448, 450
See application file for complete search history.

(56) References Cited

U.S. PATENT DOCUMENTS

| | | | | |
|---|---|---|---|---|
| 4,356,995 A | * | 11/1982 | Lohner | A21C 13/00 249/112 |
| 5,232,609 A | * | 8/1993 | Badinier et al. | A21B 3/155 249/102 |
| 5,690,019 A | * | 11/1997 | Barker | A21B 3/134 249/119 |
| 7,258,246 B2 | * | 8/2007 | Tingley | A21B 3/15 206/558 |

* cited by examiner

*Primary Examiner* — Phuong Nguyen
(74) *Attorney, Agent, or Firm* — Hall Estill Attorneys at Law

(57) ABSTRACT

An apparatus and associated methodology that is configured in conjunction with a heat source to toast sliced-sandwich bread. The toaster grill has a cooking surface defining an arcuate protuberant rib sized to be pressed into the sliced portion of the bread to contact substantially the entire rib against the inside portion of the bread. The heat source toasts the inside of the sliced bread to mold a toasted arcuate impression inside the bread. An upstanding edge supports the cooking surface so that when the edge contacts the heat source the cooking surface is spaced away from the heat source.

10 Claims, 10 Drawing Sheets

BREAD — STEP 1

HEAT — STEP 2

MOLDED U-SHAPE — STEP 3

STEP 1

BREAD

STEP 2

HEAT

STEP 3

MOLDED U-SHAPE

TOASTER GRILL

FIELD

The present technology relates generally to cooking implements and more particularly, without limitation, to a pan for toasting sliced sandwich bread.

BACKGROUND

There is a popular phrase that describes something good as "the greatest thing since sliced bread." Sliced bread in the United States was first made and sold nearly one hundred years ago, but the hot dog originated over five hundred years ago in Frankfurt, Germany.

Sliced-sandwich breads are a mainstay today for popular sandwiches. They are a practical solution for "containerizing" the contents of a sandwich with an edible handheld food item. They also permit holding hot sandwich contents without burning hands and without some other protective device.

There are generally two types of slice-sandwich buns, top-loading buns and side-loading buns. Top-loading buns are preferred for sandwiches that have contents that are likely to spill out if not positioned vertically, such as hot dogs, lobster rolls, and the like. Side-loading buns are preferred especially where toasting the sandwich is desired, such as in a submarine sandwich, a hoagie sandwich, and the like. Toasting a sandwich bun is done in one of two ways. Either the flat surface of the bun is placed in a toaster or grill to toast the outside (crust) of the bun, or the bun is opened and laid flat on the toaster or grill. The former is unsatisfactory because toasting the inside of the bun tastes better than toasting the bun's crust. The latter is unsatisfactory because opening the sandwich bun so that the two portions of the bun lay flat typically damages the bun hinge, causing the bun to fail by coming apart. The technology described herein is directed to improving the way and the result of toasting the inside of sliced-sandwich bread.

SUMMARY

Some embodiments of this technology contemplate a toaster grill that is configured in conjunction with a heat source to toast sliced-sandwich bread. The toaster grill has a cooking surface defining an arcuate protuberant rib sized to be pressed into the sliced portion of the bread to contact substantially the entire rib against the inside portion of the bread. The heat source toasts the inside of the sliced bread to make an arcuate impression inside the bread. An upstanding edge supports the cooking surface so that when the edge contacts the heat source the cooking surface is spaced away from the heat source.

Some embodiments of this technology contemplate a toaster grill having a wavy surface defined by a plurality of arcuate protuberant ribs that are each sized to toast an arcuate impression inside sliced-sandwich bread.

Some embodiments of this technology contemplate a method of toasting sliced-sandwich bread, including: obtaining a toaster grill having a cooking surface defining an arcuate protuberant rib and an upstanding edge supporting the cooking surface so that when the edge contacts a heat source the cooking surface is spaced away from the heat source; pressing the arcuate protuberant rib into the sliced portion of the bread to contact substantially the entire rib against the inside of the bread and thereby make an arcuate impression inside the bread; and heating the sliced bread in contact with the protuberant rib via the heat source to toast the inside of the sliced bread.

DETAILED DESCRIPTION

Initially, it is to be appreciated that this disclosure is by way of example only, not by limitation. The cooking implement technology herein is not necessarily limited to use on or preparation of any specific type of food. The embodiments herein that are directed to grilling a hot dog link and toasting a sliced hot dog bun are merely for the purpose of illustration and are in no way limiting. That is, the skilled artisan will appreciate that the described illustrative embodiments can alternatively be employed in conjunction with other types of foods, such as a submarine sandwich, a hoagie sandwich, and the like without the need for any additional description than what is provided herein. Thus, although the instrumentalities described herein are for the convenience of explanation, shown and described with respect to exemplary embodiments, it will be appreciated that the principles herein may be applied equally in other types of instrumentalities within the scope of the claimed embodiments.

Figure 1:
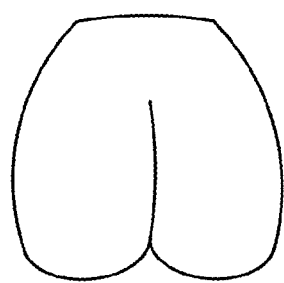
FIG. 1 is a diagrammatical depiction of an overview of this technology that molds a toasted U-shape into any type of bread.
Figure 1:
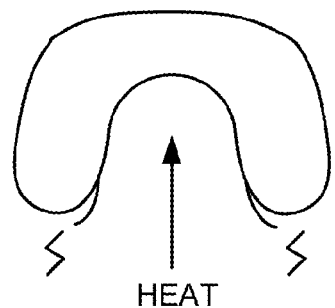
Figure 1:
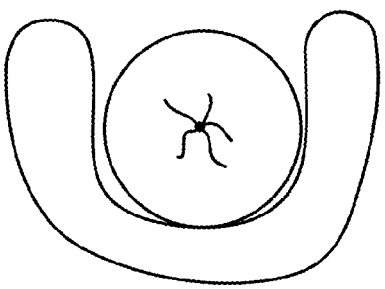

FIG. 1 is a diagrammatical depiction of general steps for practicing this technology. In step 1 the user obtains a sandwich bread, such as the sliced bun depicted in these illustrative embodiments. The skilled artisan having read this description can readily ascertain that any type of sandwich bread can be used, such as pre-sliced bread, solid rolls that are sliced by the user, flat slices of bread, and the like. In step 2 the bread is placed onto an arcuate protuberant member and heat is applied to toast the inside of the bread. The heat source is not limited to any particular sort, it can be a gas flame, an electric resistance heater, an open fire, and the like. Applying oil or butter and the like to the toasting surface of the protuberant member can enhance the toasting.

In step 3 the sliced and toasted bread is molded into a U-shape to receive contents of the sandwich, such as a food link in these illustrative embodiments.

Figure 2:
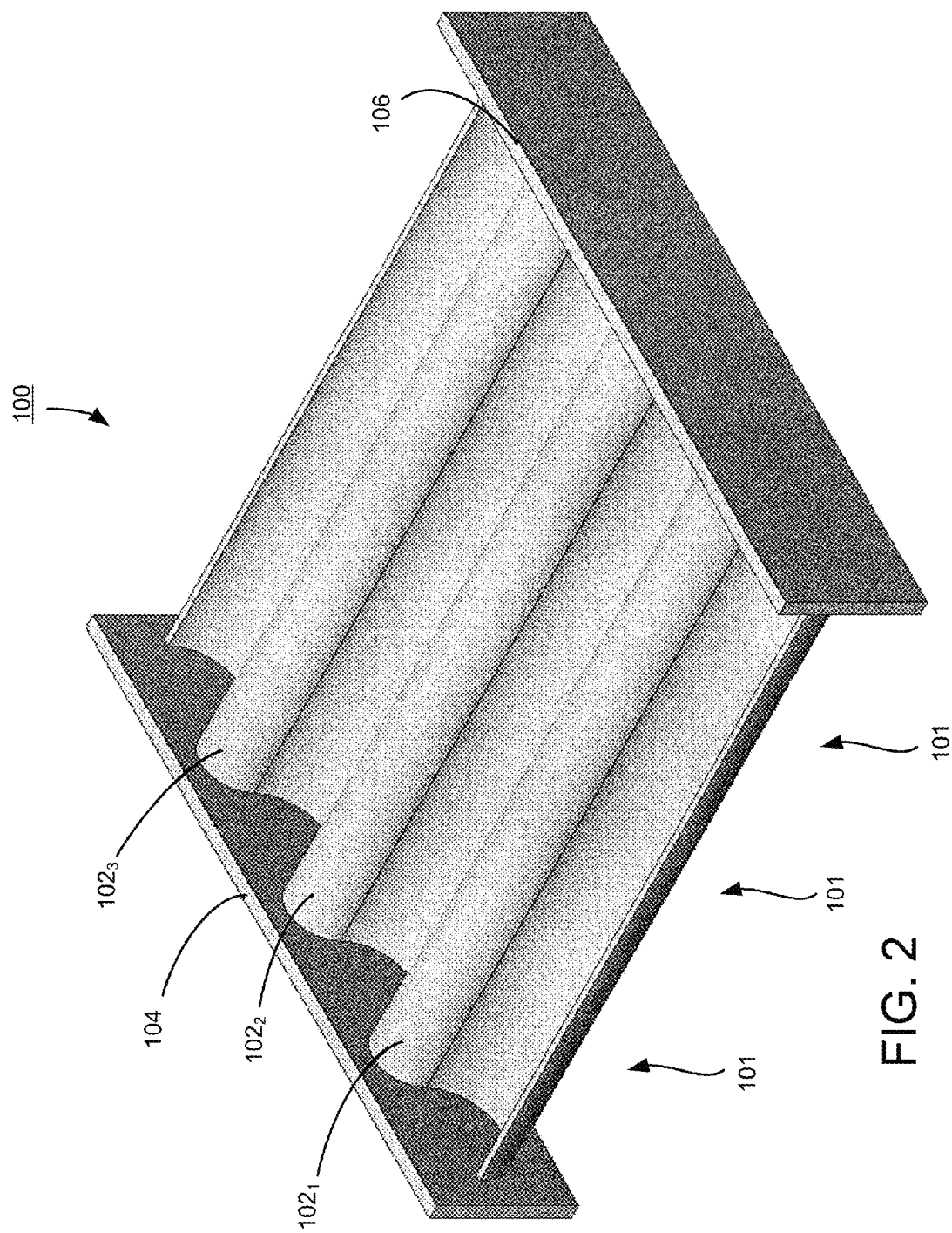
FIG. 2 is an isometric depiction of a toaster grill that is constructed in accordance with embodiments of this technology.

FIG. 2 is an isometric depiction of a toaster grill 100 that is constructed in accordance with embodiments of this technology. The toaster grill 100 is depicted as it would be used in these illustrative embodiments, although the toaster grill 100 as depicted here can alternatively be flipped over for use. In either event, the toaster grill 100 is placed over a heat source that is diagrammatically depicted by an array of reference arrows 101, such as heat coming emanating from a stove or a grill and the like. In the depicted orientation a number of arcuate protuberant ribs $102_i$ extend longitudinally and are connected at each end by an upstanding edge 104, 106. Although the toaster grill 100 in these illustrative embodiments has three ribs $102_1$, $102_2$, $102_3$, the contemplated technology is not so limited because in alternative embodiments the skilled artisan will understand that a toaster grill in accordance with this technology can be constructed with any number of ribs $102_i$ including only one rib 102. The construction and method of using each rib $102_i$ is the same, the reason for multiple ribs $102_i$ is for more cooking capacity.

Figure 3:
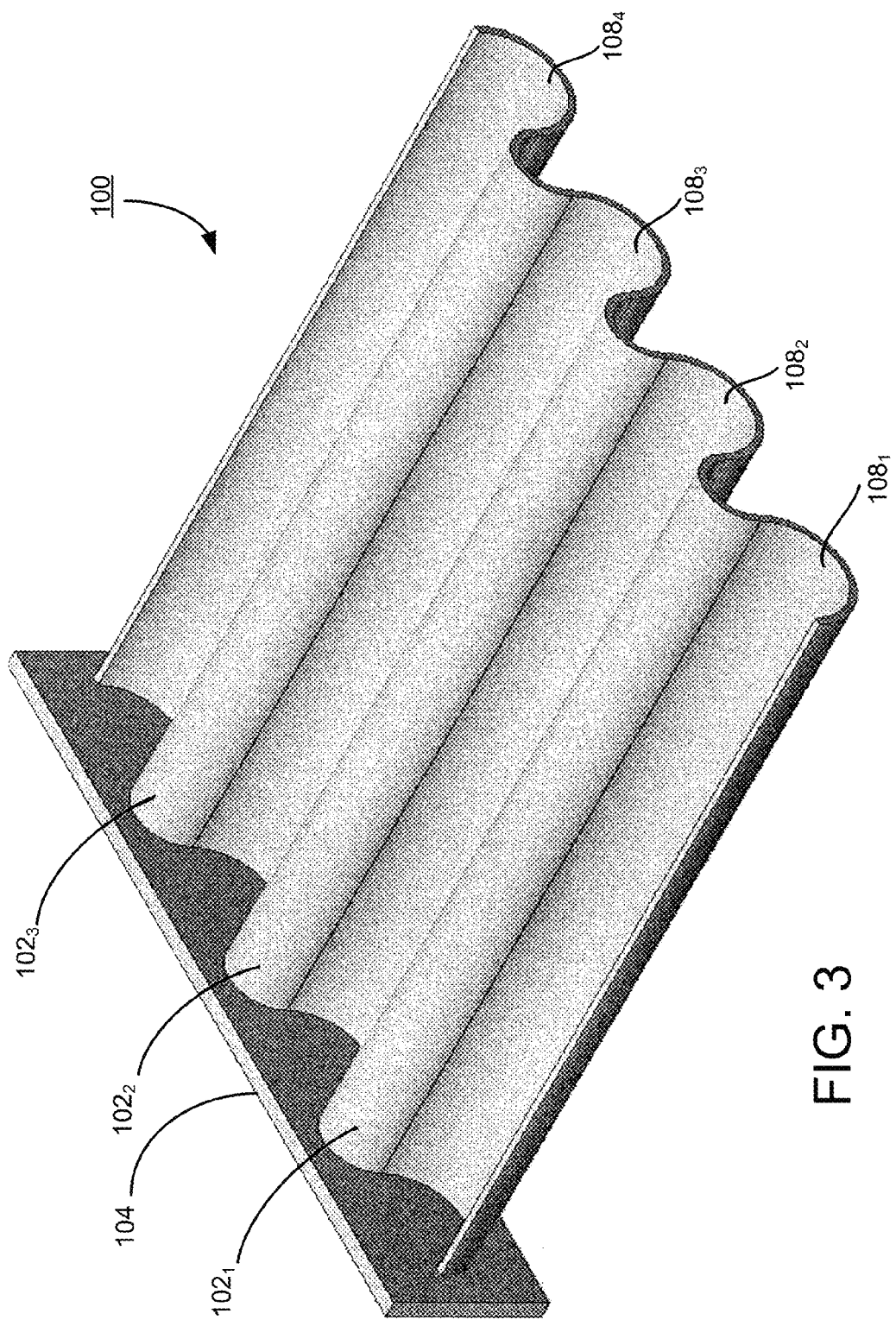
FIG. 3 is similar to FIG. 1 except that the edge on one end is removed to better show the wavy cooking surface.

FIG. 3 is similar to FIG. 2 except that the edge 106 is removed to reveal how adjacent ribs $102_i$ in these illustrative embodiments are joined together by a concave valley $108_i$. The arcuate, more particularly convex as depicted, ribs $102_i$ and the concave valleys $108_i$ cooperatively form a wavy cooking surface having a substantially constant thickness. The cooking surface can be constructed of a cast iron or a sintered material, and the like to form a solid-material cooking implement. Alternatively, the surface can be formed or extruded and the like and a coating may be applied to facilitate no-stick cooking.

Figure 4:
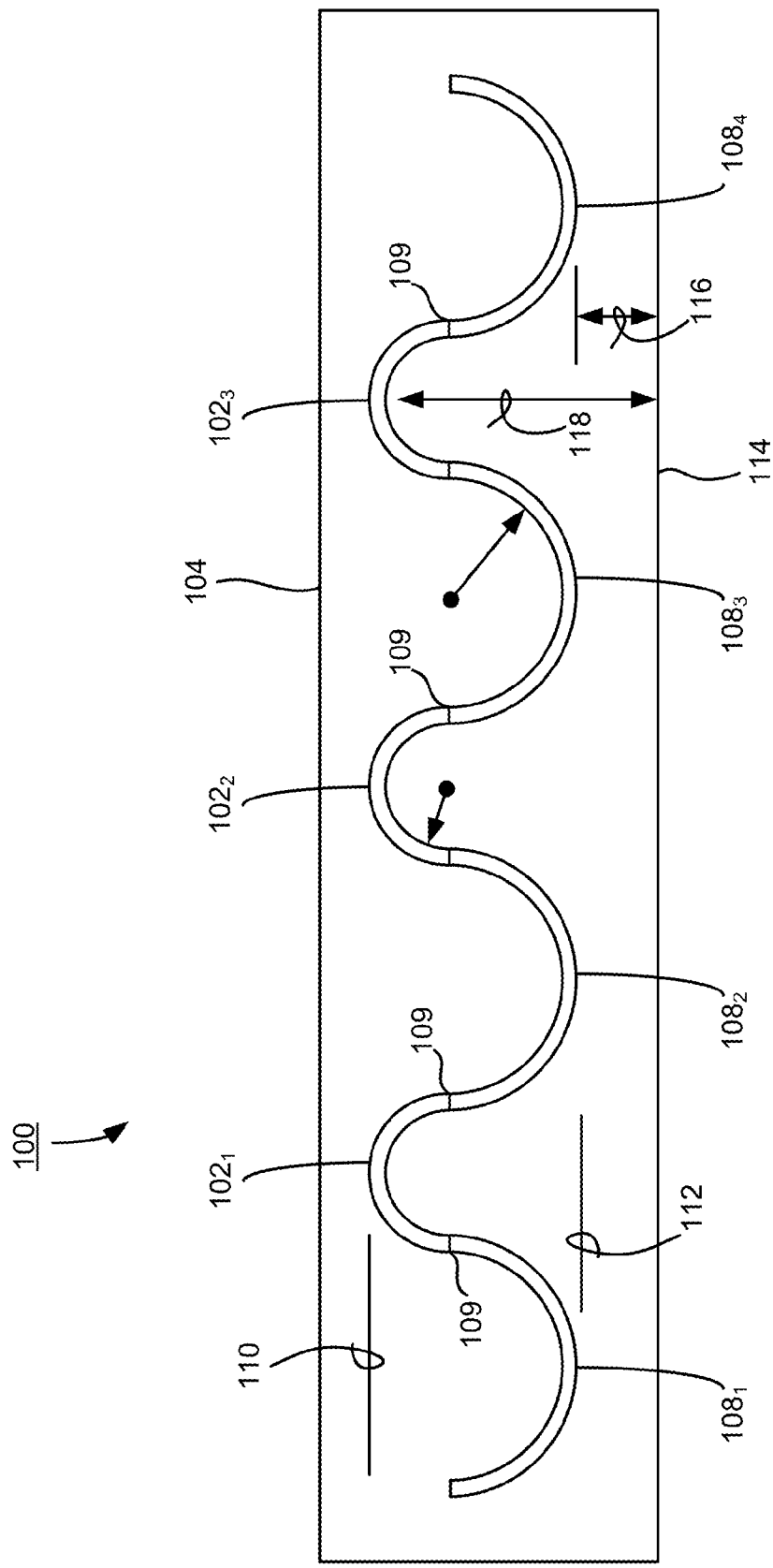
FIG. 4 is an elevational depiction of the wavy cooking surface of FIG. 3.

FIG. 4 is an elevational depiction of FIG. 3 showing that in these illustrative embodiments the ribs $102_i$ and valleys $108_i$ are substantially semi-circular, although the contemplated embodiments are not so limited. In alternative embodiments the ribs $102_i$ and valleys $108_i$ can be shaped otherwise. Also in these illustrative embodiments the wavy cooking surface is depicted as being constructed by joining each rib $102i$ to a valley 108, forming a seam 109 therebetween. In alternative embodiments not depicted the seam 109 can be eliminated by constructing the wavy surface of a unitary cast, sintered, or formed material.

The apexes of the ribs $102_i$ are substantially coplanar within a plane referenced by numeral 110, and likewise the apexes of the valleys $108_i$ are substantially coplanar within a plane reference by numeral 112. The edge 104 has a bottom surface 114 that contacts a supporting surface of the heat source 101. For example, the bottom surface 114 can contact the cooking stove or it can contact the rack in a grill, and the like. The valleys $108_i$ are positioned above the bottom surface 114 by a distance 116, and the ribs $102_i$ are positioned above the bottom surface 114 by a greater distance 118. Comparatively more heat reaches the valleys $108_i$ than ribs $102_i$. That advantageously permits grilling a food item at a higher temperature in the valleys $108_i$ while simultaneously toasting another food item at a comparatively lower temperature on the ribs $102_i$.

Figure 5:
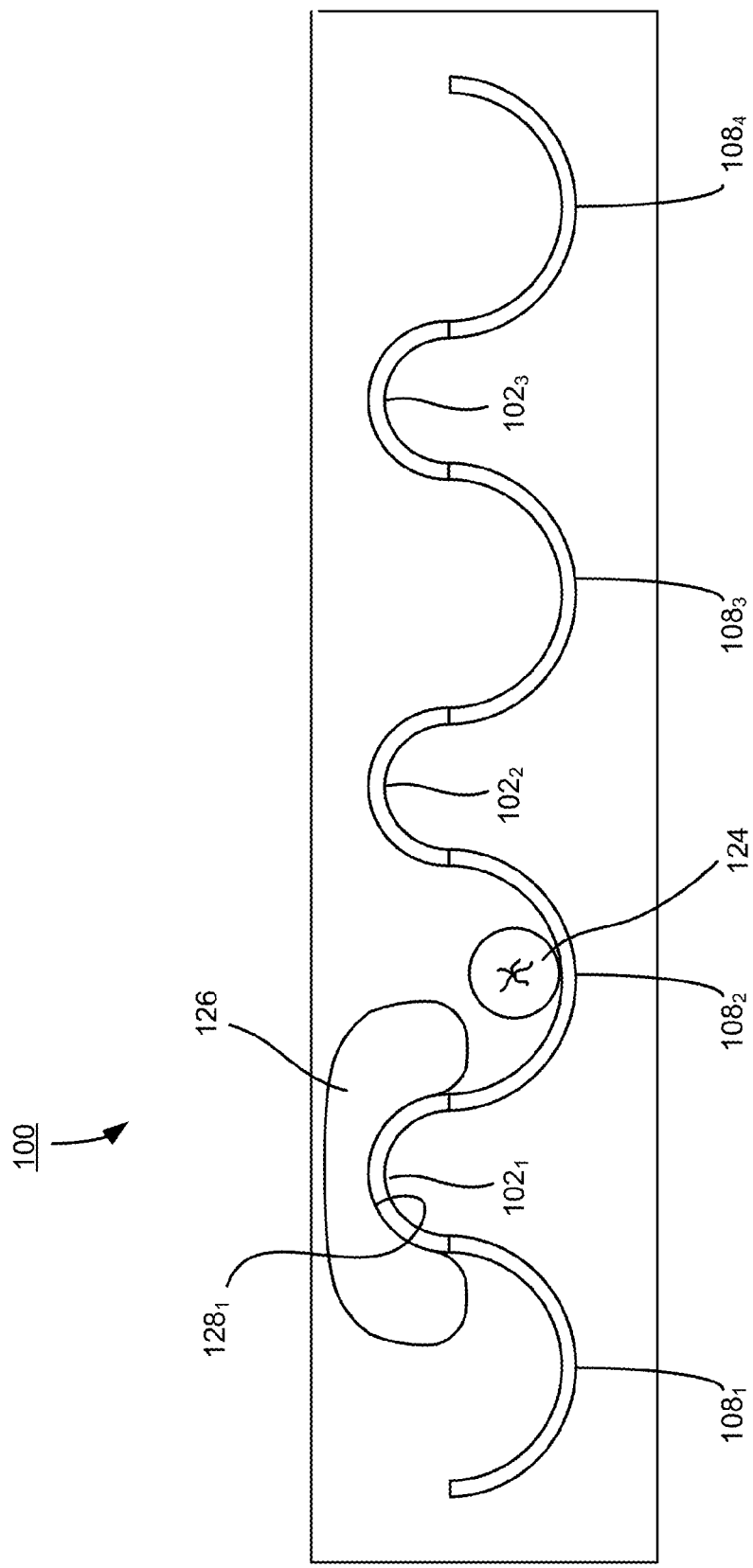
FIG. 5 is similar to FIG. 4 except that a sliced-sandwich bun and a food link are depicted as they cook in the toaster grill of this technology.
Figure 6:
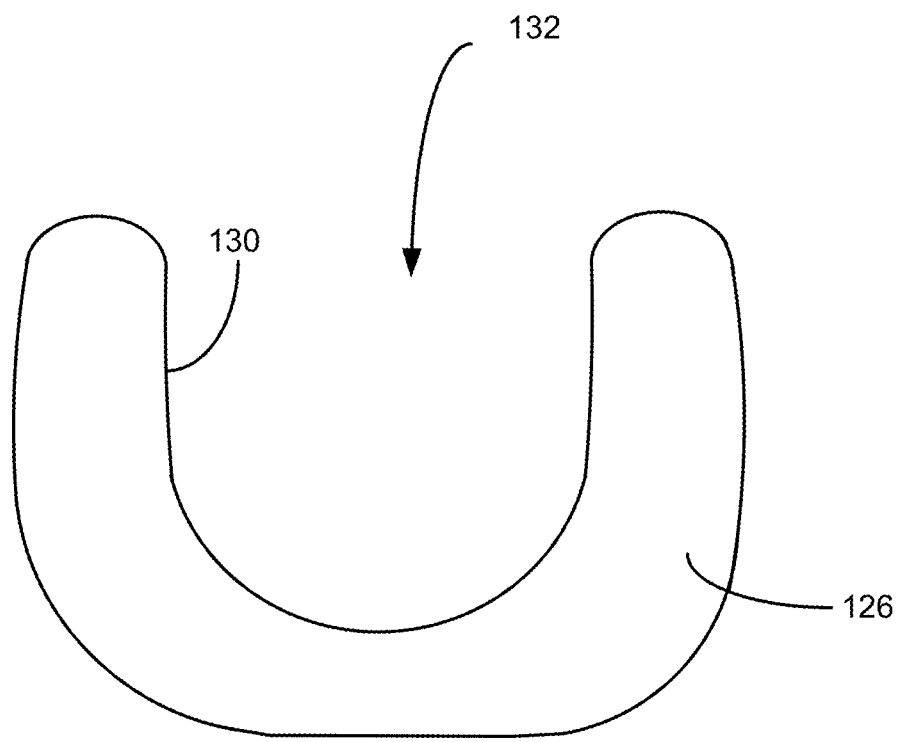
FIG. 6 is an end elevational depiction of the sliced-sandwich bun of FIG. 5 after it has been toasted in the toaster grill of this technology.

FIG. 5 depicts the toaster grill 100 in these illustrative embodiments is designed for simultaneously grilling a food link 124, such as a hot dog wiener, while toasting a sliced-sandwich bun 126, such as a hot dog bun. Being "designed" for this illustrative use of preparing hot dogs particularly means that each rib $102_i$ defines a cooking surface $128_i$ that is sized so that when pressed into the sliced portion of the bun 126 the cooking surface $128_i$ substantially entirely contacts the inside of the bun 126. That ensures the entire exposed inside surface of the bun 126 receives an even toasting as the heat source transfers heat to the ribs $102_i$. Referring to FIG. 6, being "designed" for preparing hot dogs in these illustrative embodiments also means that the cooking surface $128i$ (FIG. 5) toasts a surface 130 defining a molded arcuate impression 132 inside the bun 126 that is sized to receive a hot dog wiener 124 in an expected mating relationship therebetween. That is, the impression 132 is preferably slightly larger than the diameter of the wiener 124 in order to provide room for a clearance fit, along with the addition of toppings and condiments. In successful reductions to practice the ribs $102_i$ were constructed with material having a 1.25 inch diameter and the valleys $108_i$ were constructed with material having a 2.25 inch diameter.

In these illustrative embodiments for preparing hot dogs the ribs $102_i$ are designed to be smaller than the valleys $108_i$ because of the relative sizes of the wiener 124 and the bun 126. The contemplated embodiments are not so limited in that alternatively the ribs $102_i$ and valleys $108_i$ can be alternately proportioned or the same size. For example, without limitation, a toaster grill designed for preparing hoagie sandwiches can conceivably have same-size ribs and valleys due to the larger size of the bun and the larger amount of food contents that are grilled in the valleys $108_i$.

Figure 7:
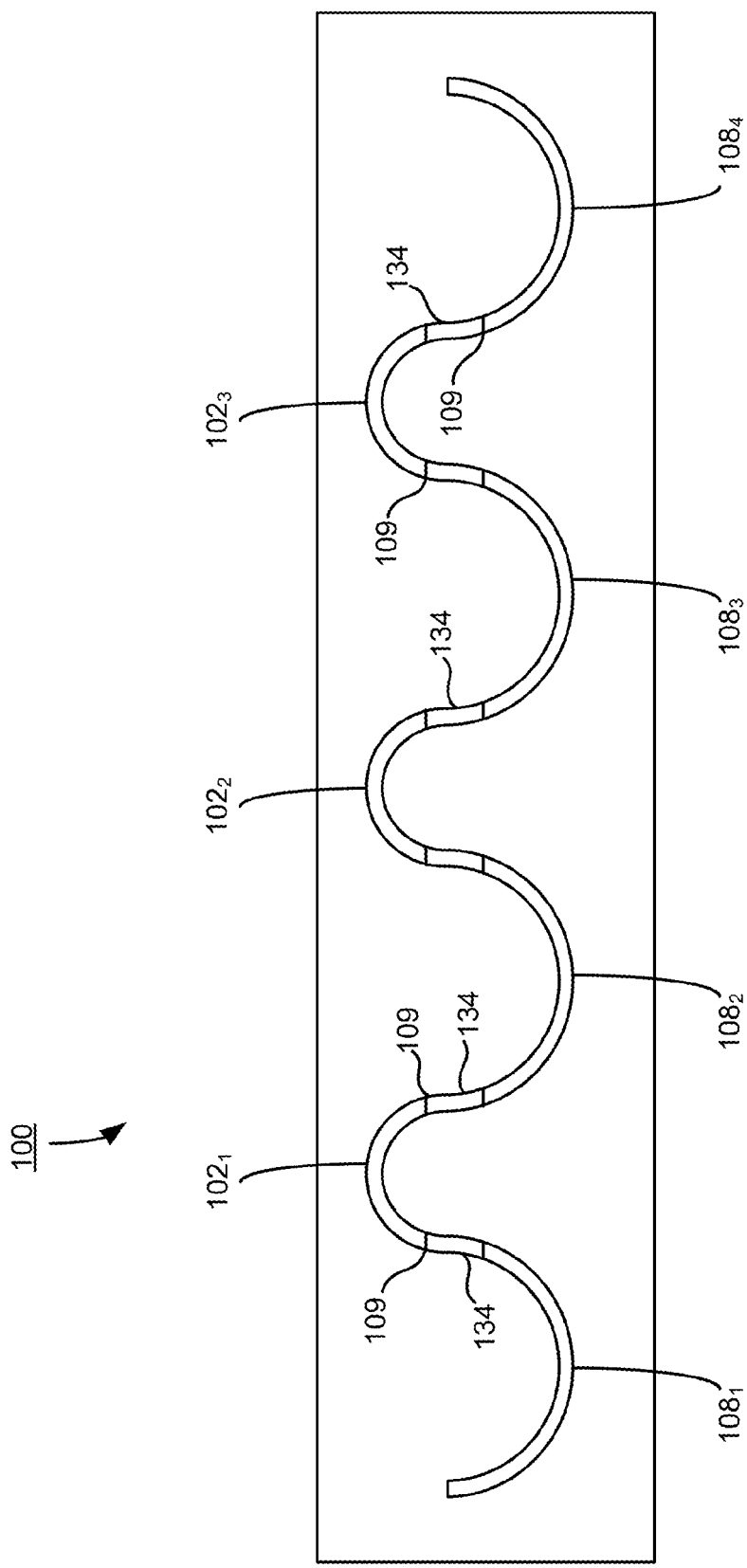
FIG. 7 is similar to FIG. 4 but constructed according to alternative embodiments that contemplate a spacer between each rib and its corresponding valley.

The embodiments described so far contemplate semi-circular ribs $102_i$ joined directly to semi-circular valleys $108_i$, but the contemplated embodiments are not so limited. FIG. 7, for example, depicts embodiments where each rib $102_i$ is separated from the adjacent valley $108_i$ by a spacer 134. The spacer 134 can advantageously space the respective rib $102_i$ farther from the heat source 101 so that higher temperatures can be used for grilling in the respective valley $108_i$ without burning the bun being toasted on the respective rib $102_i$. In these illustrative embodiments the spacer 134 is connected at opposing ends thereof by seams 109 although again the contemplated embodiments are not so limited. As discussed above, in alternative embodiments the wavy surface depicted in FIG. 7 can be unitarily constructed of a cast, sintered, formed, or extruded material and the like. Also in these depicted embodiments the spacer 134 is planar although the contemplated embodiments are not so limited; in alternative embodiments the spacer can be arcuate or angular and the like.

Figure 8:
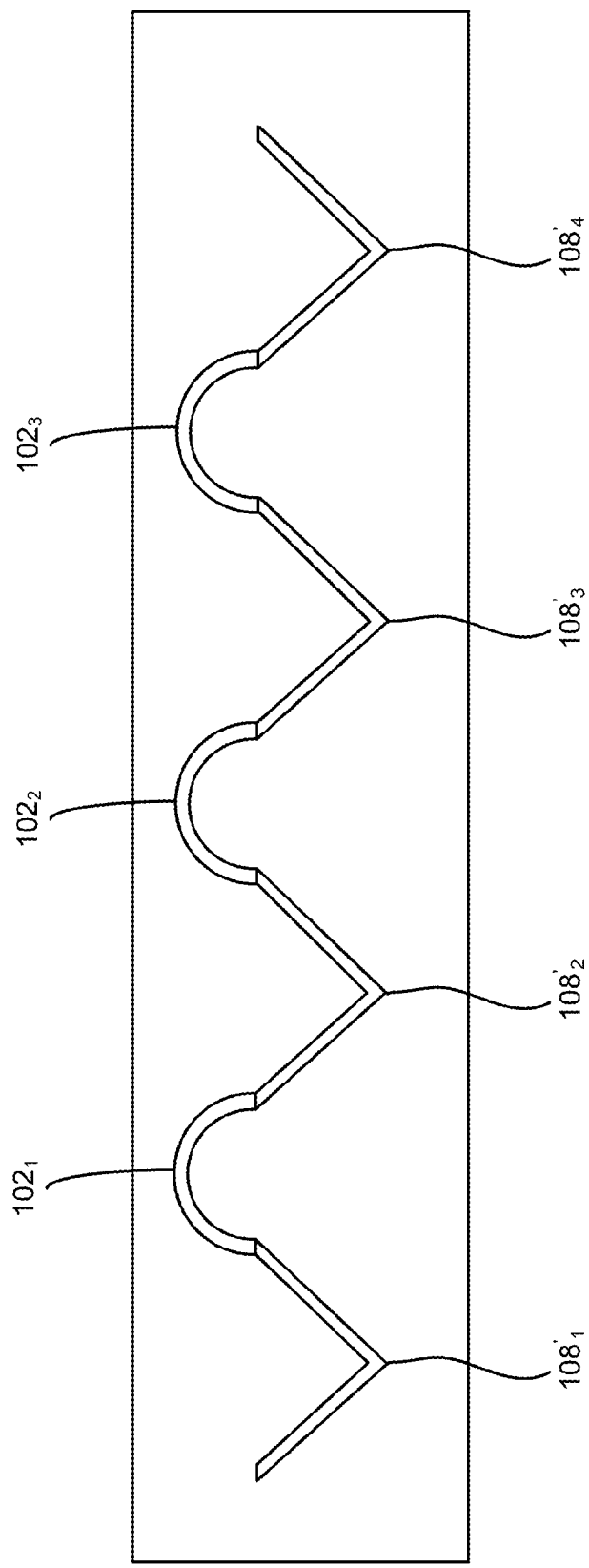
FIG. 8 is similar to FIG. 4 but constructed according to alternative embodiments that contemplate V-shaped valleys.

FIG. 8 depicts alternative embodiments that contemplate the valleys $108'_i$ being V-shaped instead of arcuate as described above. The V-shape can be advantageous such as for concentrating the grilling contact of a food link to the opposing point contacts of the round link within the V-shaped valley $108'_i$. The point contacts can transfer the grilling heat more effectively along grill mark lines instead of attempting to cook substantially only a tangential portion of the food link surface. Although not depicted, the embodiments of this technology further contemplate other shapes for the valleys $108_i$ such as but not limited to square, convex, and the like and combinations thereof, depending on the type and procedure for s grilling the food item.

Figure 10:
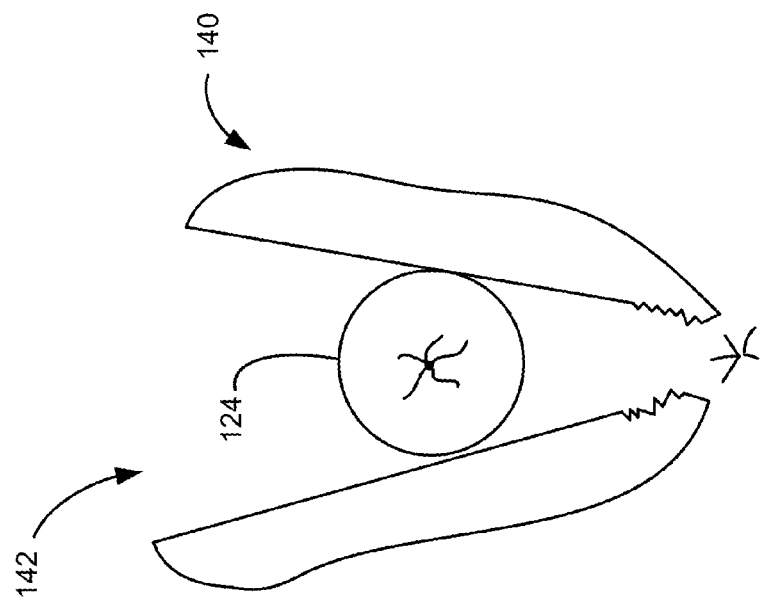
FIG. 10 depicts how the hinge in the sliced-sandwich bun of FIG. 8 is prone to failure.
Figure 9:
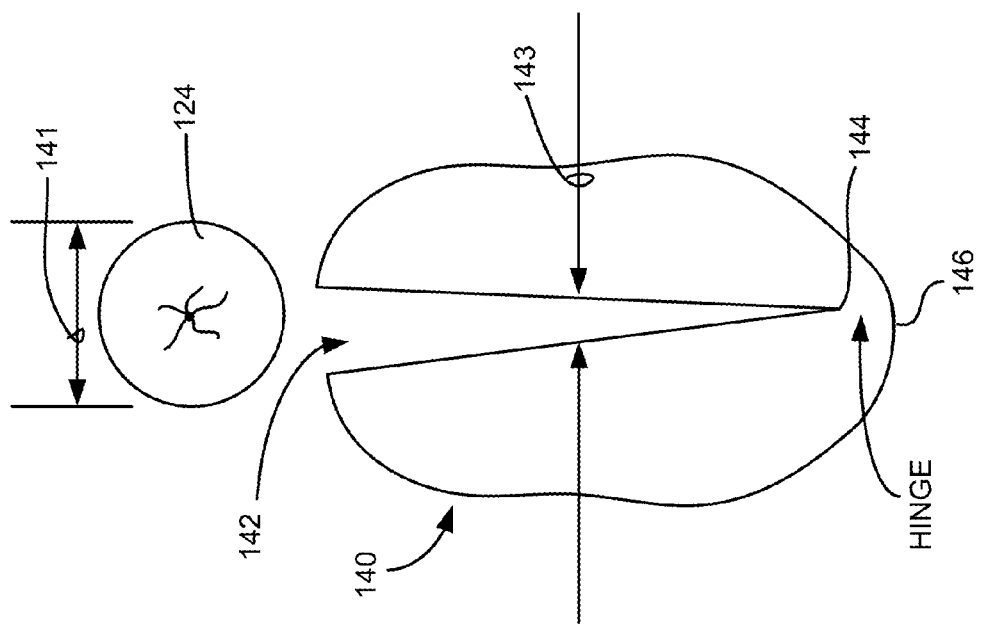
FIG. 9 depicts a related art solution for placing a food link into a sliced-sandwich bun.

Importantly, this technology resolves an inherent problem with present-day sliced sandwich buns that fail by coming apart. FIG. 9 depicts a present-day sliced sandwich bun 140 that has a cut 142 typically made by a cutting device such as a knife or a slitting cutter, leaving a sharp notch 144 at the bottom (as depicted) of the cut 142. The bun material in the space between the notch 144 and the shortest-distance outer surface 146 is commonly referred to as the "hinge" because it holds the two halves of the bun 140 together as they are spread apart to fill the bun 140 with the sandwich contents. In this case the meat link 124 had a width 141 that is significantly greater than the width 143 of the slightly opened cut 142 into which the meat link 124 is inserted. FIG. 10 depicts how spreading the sliced-sandwich bun 140 apart wide enough to insert the meat link 124 stresses the hinge to the point of failure. The sharp notch 144 is a stress intensification point that weakens the structural integrity of the hinge, commonly propagating a crack through the hinge that breaks the two halves apart. Some previous related art solutions attempt to toast the inside of the cut 142 while in the V shape depicted in FIG. 9. However, that exacerbates the problem of hinge failure because a crispy toasted bread surface defining the cut 142 is less compressible than an untoasted bread surface, meaning the toasted cut V-shaped cut pressing against the food link 124 imparts more force to the hinge making hinge failure more likely.

Figure 11:
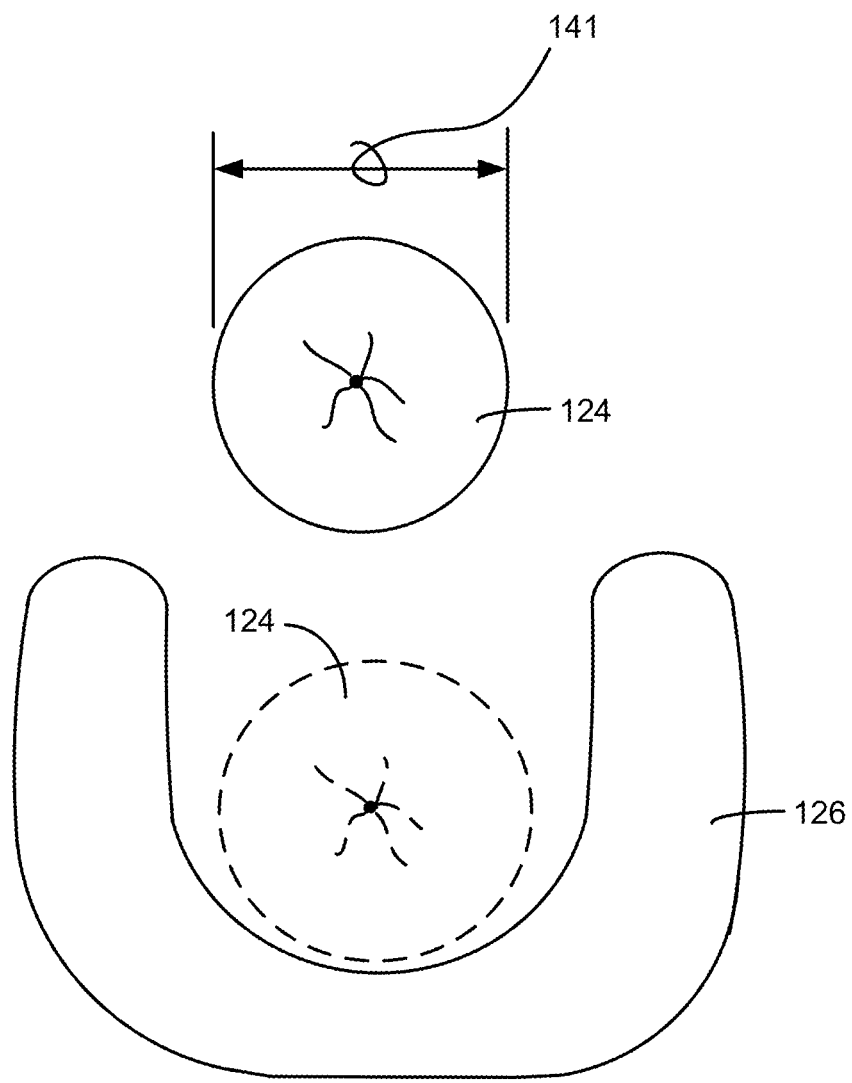
FIG. 11 depicts how the present cooking implement technology molds an arcuate impression into the sliced-sandwich bun to reshape the hinge to prevent failure of the hinge.

FIG. 11 depicts the sliced-sandwich bun 126 toasted by this technology alters the shape of the hinge to replace the sharp notch 144 with a smooth arcuate hinge. Eliminating the stress intensification point strengthens the bun 126 and thereby makes it significantly less likely to fail at its hinge. The present technology molds a toasted arcuate impression into the sliced-sandwich bun 126 that is sized to receive the food link 126, eliminating the problem in the previous attempted solutions of the food link 126 being wider than the opening into which it is inserted. The embodiments of this technology are capable of transforming any type of bread into a sandwich bun for the food link 124 by molding a toasted arcuate impression into the bread that is sized to receive the food link 124, and without imparting any undue stress on sliced-sandwich buns that have a hinge portion.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, without limitation, although the illustrative embodiments describe a free-standing toaster grill that is placed in conjunction with a heat source, the contemplated embodiments are not so limited. Alternatively, a toaster grill of this technology can be part of an appliance such as grills sold by Evolve Grill Systems and marketed as the George Foreman Grill®, as either a permanent or a removable cooking implement. Further, although the illustrative embodiments described herein are directed to cooking a wiener and bun for a hot dog, it will be appreciated by those skilled in the art that m the claimed invention can be applied to other types of sandwiches as well, with or without a sliced-sandwich bun, without departing from the spirit and scope of the present invention.

What is claimed:

1. A toaster grill configured in conjunction with a heat source to toast sliced sandwich bread, the toaster grill comprising:
    a solid-material cooking surface unitarily constructed of one of a cast, sintered, and formed material, the cooking surface configured to bend alternately in opposite directions defining a plurality of longitudinally-extending arcuate ribs and concave valleys, the valleys larger than the ribs, each valley positioned between adjacent ribs, the ribs terminating at proximal and distal edges, each rib sized to be pressed into the sliced portion of the bread to contact the rib against the inside portion of the bread and thereby mold a toasted arcuate impression in the bread as the heat source heats the cooking surface; and
    opposing upstanding edges each having a laterally-directed surface connected to the solid-material cooking surface at the proximal and distal edges of the ribs, respectively.

2. The toaster grill of claim 1 wherein the concave valley is sized to hold a food item nearer the heat source than the associated adjacent ribs.

3. The toaster grill of claim 1 wherein the concave valley is arcuate.

4. The toaster grill of claim 1 wherein apexes of the ribs are substantially coplanar.

5. The toaster grill of claim 1 configured to be a removable insert in a cooking appliance.

6. The toaster grill of claim 1 wherein the upstanding edges define plates.

7. The toaster grill of claim 1 wherein the ribs and the valleys are each substantially semi-circular.

8. The toaster grill of claim 1 comprising a planar spacer sized to space the rib away from the valley.

9. The toaster grill of claim 1 wherein the ribs and the valleys are the same thickness.

10. The toaster grill of claim 1 wherein the sliced-sandwich bread has a V-shaped opening defining a hinge, and wherein the rib operably reshapes the hinge to be defined by an arcuate opening.

\* \* \* \* \*